United States Patent [19]

Adler et al.

[11] 4,001,494
[45] Jan. 4, 1977

[54] PHOTORECEPTOR MATRIX FOR OPTICAL VIDEO PLAYBACK SYSTEM

[75] Inventors: Robert Adler, Northfield; John L. Rennick, Elmwood Park, both of Ill.

[73] Assignee: Zenith Radio Corporation, Chicago, Ill.

[22] Filed: Nov. 1, 1974

[21] Appl. No.: 519,897

[52] U.S. Cl. .......................... 358/127; 178/6.7 A; 179/100.3 V; 250/201; 178/6.6 DD; 358/128; 358/130

[51] Int. Cl.² ...................... H04N 5/76; G11B 7/00

[58] Field of Search ....... 178/6.7 A, 6.6 R, 6.6 DD; 179/100.3 V, 100.3 B, 100.3 D, 100.41 L; 360/77; 250/201, 202, 203

[56] References Cited

UNITED STATES PATENTS

| | | | |
|---|---|---|---|
| 3,381,086 | 4/1968 | Moss | 179/100.3 V |
| 3,530,258 | 9/1970 | Gregg | 179/100.3 V |
| 3,634,689 | 1/1972 | Ejiri | 250/202 X |
| 3,854,015 | 12/1974 | Janssen | 179/100.3 V |
| 3,876,827 | 4/1975 | Janssen | 179/100.3 V |

OTHER PUBLICATIONS

"An Experimental Optical Videodisc Playback System" by G. Hrbek; July 1974, Journal of the SMPTE vol. 83.

Primary Examiner—Bernard Konick
Assistant Examiner—Alan Faber
Attorney, Agent, or Firm—Cornelius J. O'Connor

[57] ABSTRACT

A matrix of four photoreceptors is arranged to develop output signals representing information stored in a video disc as well as error signals for maintaining proper tracking registration of the reading beam with the storage track of the disc. The matrix enables all four photoreceptors to contribute to the development of the output signals and permits separate treatment of high frequency and low frequency signal information for improved results with respect to response and signal-to-noise ratio.

8 Claims, 5 Drawing Figures

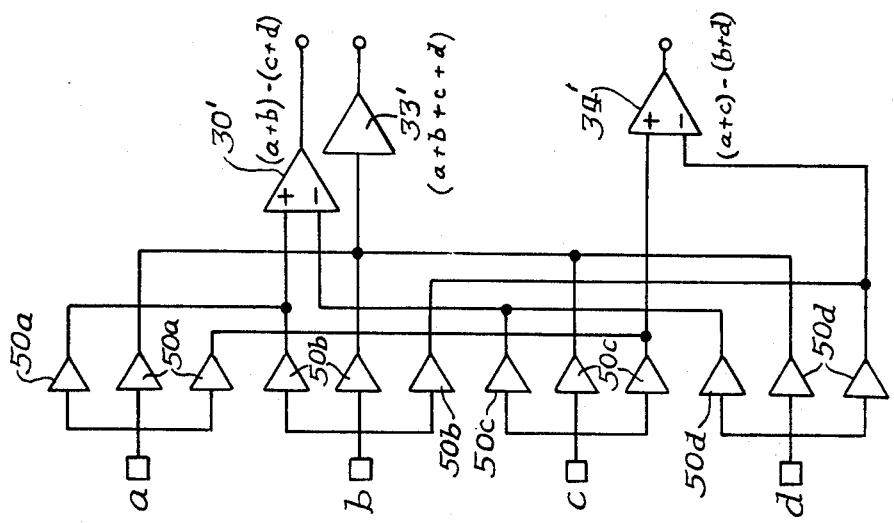
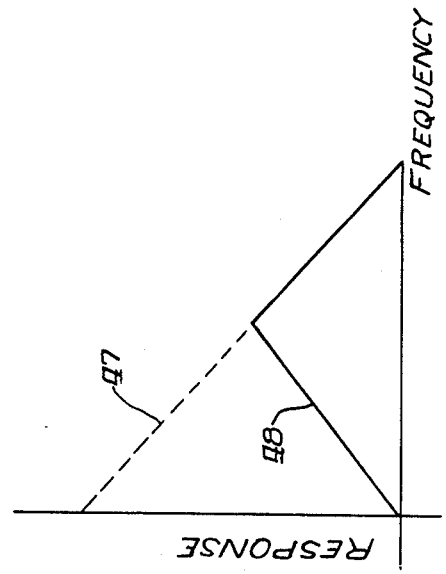
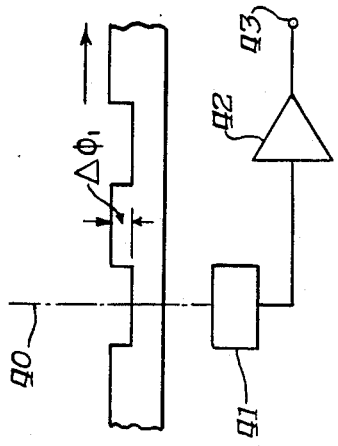
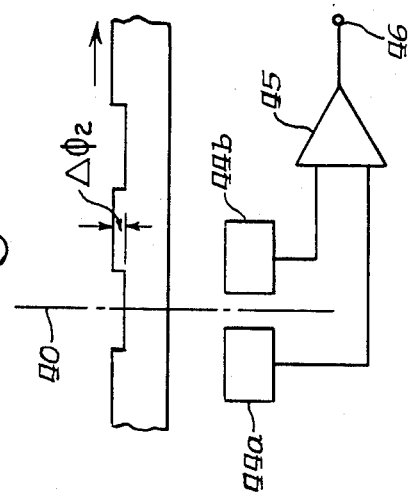

PHOTORECEPTOR MATRIX FOR OPTICAL VIDEO PLAYBACK SYSTEM

BACKGROUND OF THE INVENTION

Video disc playback systems have been proposed and, while they may operate on difference principles, the present invention is uniquely concerned with the optical variety in which information stored on a video disc is derived by scanning the storage track with a reading beam of energy. Information may be stored in such a disc in a variety of ways but the one of particular concern to the present discussion is that in which the storage track may be thought of as a diffracting object so that driving the storage track through the reading beam effects modulation of the beam as required to derive the stored information. In particular, the modulated beam impinges upon photoreceptors which develop the output signal and their operation in that respect is generally the same whether the disc is transmissive to the reading beam or is reflective. It will be convenient in the following discussion to give specific consideration to a transmissive type disc even though the description of the operation is generally applicable to systems functioning in the reflective mode.

In the preparation of a transmissive optical video disc, a master is first prepared under the control of a recording laser beam modulated by the information desired to be stored in the record. Usually the information is carried as frequency modulation of a carrier wave signal employed to modulate the recording laser to establish in the master a pattern of pits and intervening lands of constant width but of variable length to the end that they constitute a spatial representation of the modulated carrier signal. The controlling carrier signal may convey all of the information to be stored, although it is generally necessary to have other signals concurrently control the recording laser so that the stored information may comprise, for example, not only the luminance, chroma and synchronizing componenets of a video program but also audio information and, frequently, one or more pilot signals desirable in optimizing the decoding of the stored information by a player. It has been found desirable, in order to avoid interpenetration of the FM sidebands with signal components in the baseband, to choose the mean frequency of the carrier signal of a value at least twice as high as the highest video frequency modulating component to be reproduced. This enables further information, such as audio subcarriers and pilot signals to be positioned in the baseband for recording purposes without introducing undesirable intermodulation. All such recording techniques are well understood and video players are known for reading the video disc to derive the stored information.

The present invention has to do with the photoreceptor matrix of the video player employed in developing signals representing the program information and other stored information utilized in maintaining desired conditions of tracking registration of the reading beam relative to the storage track of the disc. It is, accordingly, an object of the invention to provide an improved photoreceptor matrix for the optical readout system of a video playback device.

It is another particular object of the invention to provide such a matrix which is especially attractive in separately deriving the carrier signal modulated with program information and relatively low frequency signals such as a pilot signal.

SUMMARY OF THE INVENTION

The photoreceptor matrix of this invention finds application in an optical read-out system intended to scan a video record with a reading beam of energy to derive information stored in a track on the record. The matrix comprises four photoreceptors $a$, $b$, $c$ and $d$, with $(a, b)$ arranged as a tandem pair along the direction of the track and with $(c, d)$ also arranged as a tandem pair along the direction of the track. These tandem pairs are symmetrically disposed on opposite sides of a reference plane that extends along the direction of the track, is coincident with the axis of the beam and is tangent to the track at the point where the track is scanned by the beam. Photoreceptors $a$ and $c$ have a leading relationship relative to the reading beam while photoreceptors $b$ and $d$ have a lagging relationship thereto. A first circuit means is coupled to all of the photoreceptors for differentially combining the output signals of the photoreceptors to develop a radial error correction signal $(a+b) - (c+d)$ having a polarity and amplitude related to the sense and degree of radial tracking misregistration. The matrix may be provided with a second circuit means which is coupled to all four of the photoreceptors for summing their output to derive a signal $a+b+c+d$ representative of information stored in the record. The matrix may also include a third circuit which is also coupled to all four of the photoreceptors to combine the output signals thereof to develop another output signal $(a+c) - (b+d)$ representing additional information stored in the record.

BRIEF DESCRIPTION OF THE DRAWING

The features of the invention which are believed to be novel are set forth with particularity in the appended claims. The invention, together with further objects and advantages thereof, may best be understood by reference to the following description taken in conjunction with the accompanying drawings, in which:

FIGS. 2a–2c are explanatory diagrams used in describing the operation and characteristics of that matrix; and FIG. 3 is another embodiment of the matrix.

DESCRIPTION OF THE PREFERRED EMBODIMENT

Figure 1:
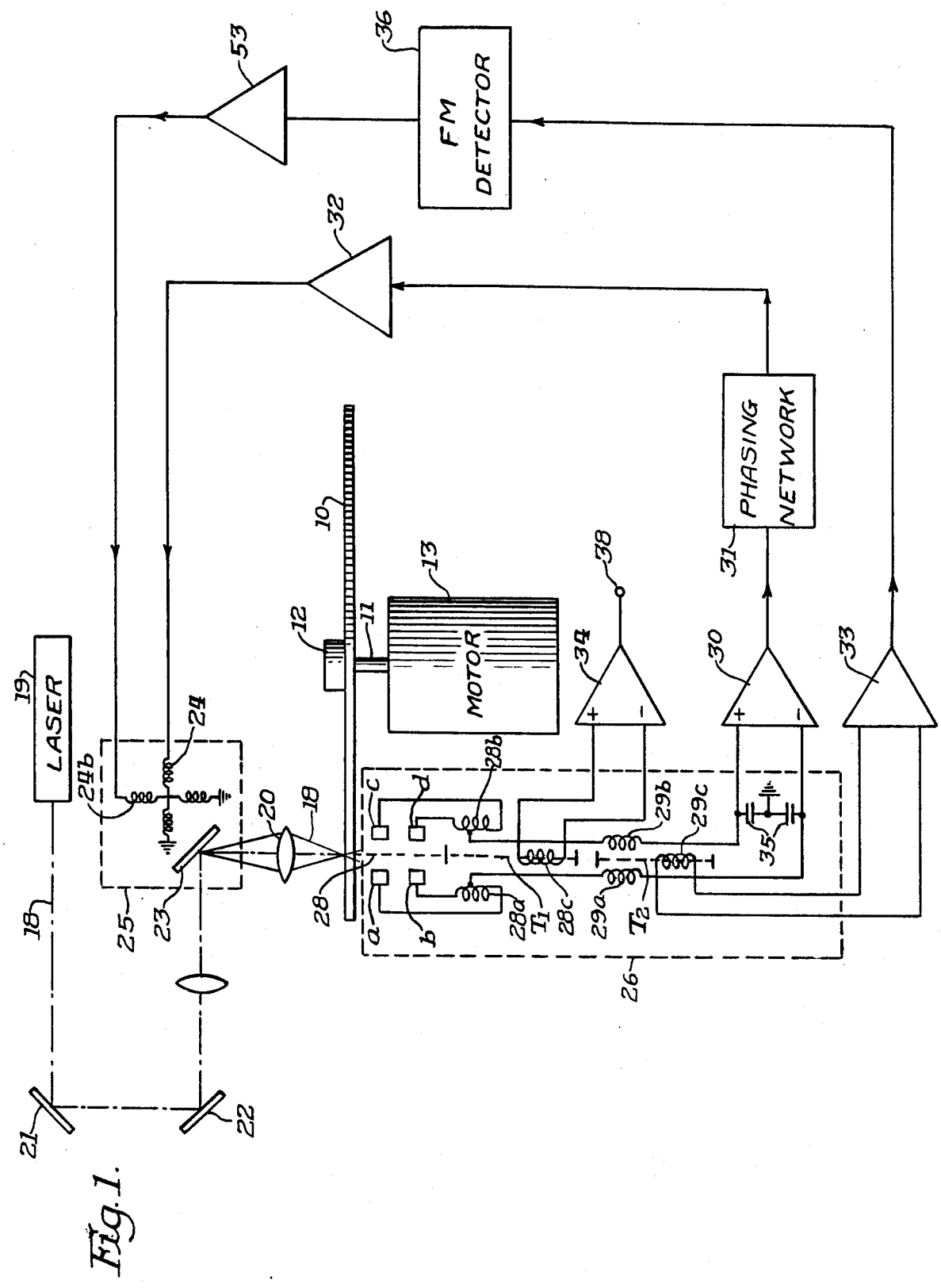
FIG. 1 is a schematic representation of an optical video player including a photoreceptor matrix embodying the invention.

The playback system of FIG. 1 reads out information stored in a record carrier or video disc 10 of suitable material, such as polyvinyl chloride, which has the capability of storing program information. The information is carried in a multiturn spiral-shaped track that is transferred to the disc from a stamper prepared from a master having a similar storage track in which information is stored under the control of a suitably modulated recording laser beam. Since the master making and disc replication constitute no part of the invention and are in themselves known to the art, there is no need for a further description of the disc making process. It will be assumed, however, that the disc is a spatial representation of those signals under the control of which the recording laser has stored information onto the master and comprising a frequency modulated carrier having program information and also a relatively low frequency pilot signal. The frequency modulated carrier conveys luminance, chroma and synchronizing information and as indicated above, its nominal frequency is at least twice as high as the highest video frequency component desired to be reproduced. Illustratively, the FM carrier may have a mean frequency of 7 MHz and the pilot signal may have a frequency of 780 kilohertz.

The disc may be of sufficient thickness to be mechanically rigid. It may be supported on a turntable in the playback apparatus and provided with a conductive coating to operative in the reflective mode. Alternatively, and as is assumed for the case under consideration, the disc may be transmissive to the reading beam and may be sufficiently thin to be flexible in which case it is supported by a spindle 11, retained in position by a removable cap 12 and driven by a motor 13. The motor rotates the spindle and disc at a relatively high speed, usually 1800 rpm, to accomplish what is referred to as flying the disc.

Reading of disc 10 to develop electrical signals representing stored information of the disc is accomplished by a beam 18 developed by a laser source 19 which projects a beam of monochromatic coherent light along a path to a final or focusing lens 20 which focuses the reading beam onto the storage track of the disc. The physical relationship of source 19 to lens 20 is of no particular moment since the light path is easily determined by mirrors, such as stationary mirrors 21 and 22 and a movable mirror 23 positioned properly to present the reading beam to focus lens 20. Mirror 23 is selectively displaceable along orthogonal axes by a driver energized by tracking correction signals to maintain the reading beam in optimal tracking relation to the disc.

One type of adjustment of mirror 23 results in the displacement of the reading beam in a selected direction and controlled amount radially of the video disc. This is for the purpose of maintaining the beam centered in the track and correct for radial tracking errors that are frequently encountered. The remaining type of displacement is likewise of selected direction and controlled amount but tangentially rather than radially of the storage track to compensate timing errors that are likewise frequently encountered. For the most part, they represent eccentricities in the disc and occur at frequencies in the range from 30 to 120 hertz, being multiples of the disc rotational frequency. Mirror 23, its mechanical support and the means, responsive to applied error correcting signals for adjusting the position of the beam relative to the record track, may conveniently be of the type described and claimed in co-pending application Ser. No. 456,918, filed Apr. 1, 1974 by Karl Wossidlo, now U.S. Pat. No. 3,946,166, which issued March 23, 1976, and assigned to the assignee of the present invention. This structure, at least as to the controlled displacement of mirror 23, is essentially an electomagnetic motor having one pair of windings 24a energized by a radial tracking correction signal and a second pair of windings 24b energized by a timing correction signal to control the position of mirror 23. Since as described in the Wossidlo application, this whole arrangement may conveniently be constructed as a single sub-assembly, it is represented by broken-line rectangle 25. The described arrangement constitutes means for controlling the reading beam to derive the pilot signal and program signal during scanning of the disc.

In order to track the record and read out all segments of its storage track, it is necessary that the reading beam be moved continuously and at the proper speed in a radial direction over the disc while the disc is spinning under the control of motor 13, assuming that the disc is to be read without interruption from start to finish of the track. This is accomplished by a carriage which supports lens 20, mirror subassembly 25 and a photoreceptor matrix, presently to be described. Since such a carriage mechanism is readily understood to those skilled in the art and since it constitutes no part of the subject invention, it has been omitted from the drawing merely for simplification.

Inasmuch as disc 10 is assumed to be transmissive to reading beam 18 the photorceptor matrix, represented by broken-line rectangle 26, is positioned to the side of record 10 opposite that from which reading beam 18 approaches the record and lies in a plane substantially parallel to the disc. The matrix has four photoreceptors $a$, $b$, $c$ and $d$ arranged in two pairs $a,b$ and $c,d$ symmetrically disposed on opposite sides of a reference plane designated by dash-dot line 28. The reference plane is coincident with the axis of the reading beam and tangent to the record track at the point where it is scanned by the reading beam. Elements $a$ and $b$ of the matrix constitute one pair disposed on one side of reference plane 18, while elements $c$ and $d$ constitute another pair symmetrically disposed on the opposite side of that plane. Moreover, the elements of each pair are displaced along the direction of the track. It it is assumed that the left hand side of disc 10 rotates out of the plane of the drawing, as viewed in FIG. 1, thén elements $a$ and $c$ may be considered to have a leading, whereas elements $b$ and $d$ may be considered to have a trailing, relationship relative to the reading spot. A four photocell matrix, as such, for developing an output signal as a consequence of reading a transmissive disc having quarter-wave pits is known in the art; the subject invention has to do with interconnections of the elements of the matrix, described hereafter, to improve the response to scanning of the disc. As used here, the expression "quarter-wave pits" means pits in a transmissive or reflective disc of such depth that there is a phase change of 90° between portions of the reading beam entering a pit and portions that enter a contiguous land along the track. In the scanning of such a disc, the reading beam is diffracted forwardly and rearwardly along the direction of the storage track by the leading and trailing edges, respectively, of a pit as that pit passes through the reading beam. It is for this reason that the photocells of each pair are displaced from one another in the direction of the track, as described.

First circuit means coupled photocells on opposite sides of the reference plane for differentially combining their outputs as follows: $(a + b) - (c + d)$, in order to develop a radial error correction signal having a polarity and amplitude related to the sense and degree of radial tracking misregistration. This circuit means comprises a differential amplifier 30 having two input terminals. Output signals from photocells $a$ and $b$ are coupled to one of these input terminals, while output signals from photocells $c$ and $d$ are coupled to the other, so that the desired combination of signals appears in the output of amplifier 30. The output from differential amplifier 30 is applied through a phasing network 31 and an amplifier 32 to winding pair 24a of the motor drive of displaceable mirror 23. This will be recognized as a radial servo system in which an error signal is developed to maintain radial tracking of the reading beam relative to the portion of storage track under scansion.

In the arrangement illustrated in FIG. 1, the output signals from the four photocells arrive at the input terminals of differential amplifier 30 not directly but after passing through a matrix of transformer windings. These windings are so arranged, however, that they present negligible impedance to the desired combination of signals $(a+b)-(c+d)$. Signal currents of equal polarity originating in cells $a$ and $b$ pass through the two halves of center-tapped primary winding 28a of transformer $T_1$ in opposite direction, thus producing no effect in this transformer; the same holds for equal polarity currents originating in cells $c$ and $d$ and passing through the two halves of the other center-tapped primary winding 28b of transformer $T_1$. The combined signal current from cells $a$ and $b$ then flows through primary winding 29a of transformer $T_2$, while the combined signal current of cells $c$ and $d$ flows through the other primary winding 29b of the same transformer. These two primary windings have the same number of turns and are wound in such a sense that signal currents of equal polarity—say, downward in FIG. 1—add in the output in secondary winding 29c. Equal and opposite signal currents, on the other hand, have no effect in transformer $T_2$. It is precisely the combination of signal currents, however, to which the differential amplifier 30 responds.

A second circuit means, likewise coupled to all four of the photocells, additively combines their outputs as follows: $a + b + c + d$, to derive a signal representing certain information stored in the record. This operation is suitable for baseband signals, for example, a sound carrier, and for the case under consideration, the pilot signal. This second circuit means comprises transformer $T_2$. As previously explained, primary windings 29a and 29b of this transformer are so poled that signal currents passing through them in the same direction, say, downward in FIG. 1, add in the output in secondary winding 29c. Signal current components of the desired type, having the same polarity in all four cells, meet this condition, so that a voltage corresponding to the desired sum appears across secondary winding 29c. Being of equal polarity, the two currents arriving at the two input terminals of differential amplifier 30 do not produce an output signal in this amplifier. It is, however, necessary to provide a path through which the two currents can return to ground. This is most easily accomplished by the two capacitors 35, taking advantage of the fact that signals of the type $(a+b+c+d)$, such as a pilot carrier or a carrier modulated with audio signals, are normally at frequencies above 100 kilohertz, while the radial tracking signals to be amplified in differential amplifier 30 are normally at frequencies below 10 kilohertz. There is, therefore, ample separation between the two frequency bands. If desired, however, any known means for discriminating between balanced and unbalanced signals, such as a transformer having a center-tapped primary winding with the tap returned to ground, may be used.

The baseband signal of particular interest, e.g., the pilot signal, is extracted from secondary winding 29c. After amplification in an amplifier 33, this signal is delivered to an FM detector 36 that develops a timing error correction signal which is applied through amplifier 53 to the other winding pair 24b of the driving motor of mirror 25. This servo system, by displacing the beam tangentially of the record track in the proper direction and amount as determined by the timing error signal from detector 36 compensates timing irregularities that may otherwise be experienced.

There is a third circuit means, likewise coupled to all four photocells, for combining the outputs thereof as follows: $(a + c) - (b - d)$ to develop another output signal representing other information stored in this disc. Again, for the case at hand this output conveys the luminance and chroma information. As shown, this third circuit means comprises transformer $T_1$ and more specifically, the secondary winding 28c of that transformer. As previously explained, any signal components which are of the same polarity in cells $a$ and $b$ or in cells $c$ and $d$ produce no effect in this transformer. But signal components which have opposite polarity in cells $a$ and $b$, or in cells $c$ and $d$, produce voltages in secondary winding 28c. Specifically, primary windings 28a and 28b are so poled with respect to each other that signal components of equal polarity appearing on cells $a$ and $c$ add in the output of secondary winding 28c. Therefore, the signal voltage across that secondary winding corresponds to the sum of the two differences $a-b$ and $c-d$ which is $(a+c) - (b+d)$.

If the signal components from cells $a$ and $b$ are opposite and equal, so that the sum $a+b$ equals zero, the center tap of primary winding 28a remains at ground potential. The same holds for components from cells $c$ and $d$ with reference to primary winding 28b. Signals of the type $(a+c) - (b+d)$, therefore, do not appear in transformer $T_2$ or at the input of the differential amplifier.

For the case here illustrated, secondary winding 28c is connected to amplifier 34. This amplifier supplies to an output terminal 38 the frequency modulated carrier signal bearing the video program information that has been stored in the disc.

Radial tracking errors cause an imbalance of photocurrents about the reference plane, and an appropriate radial error signal is developed by a configuration of the photocell matrix that is anti-symmetrical about that plane. The pilot signal supplied to the timing servo is developed in a configuration of photocells of the matrix that exhibits properties advantageous to duty factor modulation by low frequency signals and the tangential servo system may be supplied with the appropriate filters to be selective to the pilot signal. At the same time, the information bearing FM carrier is developed by another, specifically different, combination of photocells of the matrix whose properties favor detection of frequency-modulated signals of relatively high frequency, and, if desired, filters may also be associated with amplifier 34, causing it to have a high pass characteristic further to favor separation of the FM carrier from the pilot signal.

The differences in response of the various combinations of the photocells available through the described matrix network will now be explained with reference to FIGS. 2a–2c. Fig. 2a represents a segment of a disc moving in the direction of the arrow through the reading beam designated by axis 40. The disc is transmissive and the light beam, modulated as a consequence of moving the disc through the light path, impinges upon a single photocell 41 which is positioned along axis 40 of the beam to develop an output supplied through an amplifier 42 to a terminal 43. This signal cell arrangement typifies a prior art practice for reading a transmissive disc having half-wave pits $\Delta \phi_1$, i.e., pits having a depth such that the phase change between portions of the beam which enter the pit contrasted with portions of the beam that impinge upon a land adjacent to the pit is 180°. This photocell arrangement is especially well suited to the half-wave pit disc structure where the effect of each pit is a radial diffraction of the reading beam and is to be contrasted with the arrangement of FIG. 2b used in reading quarter-wave pits $\Delta \phi_2$ in which the depth of such pits is such that the phase shift of light entering the pit, contrasted with light impinging upon an adjacent land, is 90°. For a quarter-wave pit the pickup or photoreceptor arrangement takes the form of two photocells 44a and 44b symmetrically disposed, in a leading and lagging relationship, on opposite sides of a reference plane which coincides with the axis 40 of the reading beam. As is apparent from a study of FIG. 2b, this reference plane is at right angles to the track under scansion. These photocells deliver their outputs to a differential amplifier 45 which supplies an output terminal 46.

The cell arrangement of FIGS. 2a and 2b have distinctly different modulation transfer functions which are indicated by the broken-line chracteristic curve 47 and the full-line characteristic curve 48, respectively, of FIG. 2c. It will be observed that the response of the two-cell arrangement of FIG. 2b, usually referred to as a tangential push-pull arrangement, drops to zero at zero frequency, whereas the single cell response increases as the frequency decreases. It has been determined that if the two cells of the tangential arrangement of FIG. 2b are connected in phase or in push-push rather than in push-pull, they act like a single cell with a modulation transfer function like that of curve 47. The feasibility of changing connections from push-pull to push-push will be understood from a further discussion of the arrangements of FIGS. 2a and 2b.

The single cell arrangement (FIG. 2a) produces maximum output with 180° pits, but yields a finite output with any phase between 0 and 180°. In particular, its output for quarter-wave pits is about half that for halfwave pits.

On the other hand, the push-pull arrangement (FIG. 2b) has zero output for 180° phase shift but maximum output for 90° phase shift.

Accordingly, 90° pits provide excellent output in differential arrangements and still quite reasonable output in a single cell arrangement, especially at low frequencies where the modulation transfer function favors the single cell.

The matrix arrangement of FIG. 1, with the various connections afforded by transformers $T_1$ and $T_2$ and the differential amplifiers, provides a combination of responses that may be used addvantageously in deriving separately the frequency modulated carrier signal on one hand and a baseband sound carrier or frequency pilot on the other, while also providing a radial error signal. The four photocells a, b, c and d function similarly to a single cell in deriving the baseband frequency pilot signal because the interconnections of the transformer windings cause the contributions of all four cells to be combined additively in developing that signal. In a practical embodiment of this arrangement, the pilot has been obtained with an improved signal-to-noise ratio and with a greater amplitude than could be obtained with two cells employed in a tangential push-pull matrix like that of FIG. 2b. At the same time, in developing the FM carrier the four photocells of the matrix operate essentially as two tangential push-pull arrangements which augment one another. So far as the radial error servo system is concerned, the effect again is about twice that of matrix systems previously used in that the differential combination of the outputs of cell pair a, c is essentially the same as the obtained from cells b, d and again they augment one another.

It is not necessary to use transformer coupling in the manner of FIG. 1 to practice the present invention. An alternative scheme, illustrated in FIG. 3, associates three amplifiers with each of the four photoreceptors a, b, c and d. More particularly, amplifier trios 50a, 50b, 50c and 50d are coupled to photoreceptors a, b, c and d, respectively. As shown in FIG. 3, the amplifiers are arranged so that an input terminal of each of amplifiers 50a is coupled to photoreceptor a, while its output terminals are individually coupled to a differential amplifier 30', to an amplifier 33' and to a differential amplifier 34'. In like fashion the input terminals of amplifers 50b, 50c and 50d are coupled to their respective receptors b, c and d while assigned output terminals of these amplifiers are individually coupled to differential amplifier 30', amplifier 33' and diferential amplifier 34'. Arranged in the manner shown, receptors a and b are coupled through amplifiers 50a and 50b to one input terminal of differential amplifier 30' while receptors c and d are coupled through amplifiers 50c and 50d to another input terminal of differential amplifier 30' to the end that output signal $(a+b) - (c+d)$ is derived from amplifier 30'. In a similar fashion, and by virtue of the interconnections depicted in FIG. 3, the output signal $(a+b+c+d)$ issues from amplifier 33' while the third output signal $(a+c) - (b+d)$ is developed by differential amplifier.

While there have been described particular embodiments of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. In an optical readout system for scanning a video record with a reading beam of energy to derive information stored in a track on said record, a photoreceptor matrix comprising:

four photoreceptors a, b, c and d with (a,b) arranged as a tandem pair along the direction of said track and with (c,d) also arranged as a tandem pair along the direction of the track, said pairs being symmetrically disposed on opposite sides of a reference plane that extends along the direction of said track and is coincident with the axis of said beam and tangent to said track at the point where it is scanned by said beam, with photoreceptors a and c having a leading relationship relative to said reading beam and photoreceptors b and d having a lagging relationship thereto; and first circuit means coupled to all of said photoreceptors for differentially combining the output signals thereof of said photoreceptors to develop a radial error correction signal $(a+b) - (c+d)$ having a polarity and amplitude related to the sense and degree of radial tracking misregistration.

2. A matrix in accordance with claim 1 which also includes second circuit means also coupled to all four of said photoreceptors for summing their outputs to derive a signal $a + b + c + d$ representing information stored in said record.

3. A matrix in accordance with claim 2 which further includes third circuit means likewise coupled to all four of said photoreceptors to combine the output signals thereof to develop another output signal $(a+c)-(b+d)$ representing additional information stored in said record.

4. A matrix in accordance with claim 3 for reading a record in which the stored information represents an angel-velocity-modulated carrier signal, in which the stored information further represents another information signal having a frequency below the band occupied by said modulated carrier signal, in which said second circuit means is selective to frequencies corresponding to said other information signal, and in which said third circuit means derives said modulated carrier signal.

5. A matrix in accordance with claim 4, in which said other information signal is a pilot signal having an amplitude small relative to that of said modulated carrier signal, and in which said matrix is combined with means responsive to said pilot signal for developing a timing error correction signal.

6. A matrix in accordance with claim 5 in which said first circuit means comprises a differential amplifier coupled between the center taps of two primary windings of a first transformer individually connected between an assigned one of said pair of photoreceptors, in which said second circuit means comprises a second transformer having two primaries connected between said center taps and the input terminals of said differential amplifier and having a secondary winding for deriving said pilot signal, and in which said third circuit means comprises a secondary winding of said first transformer.

7. A matrix in accordance with claim 1 further including a differential amplifier and in which said first circuit means comprises a plurality of amplifiers intercoupling all of said photoreceptors and said differential amplifier.

8. A matrix in accordance with claim 3 in which each of said first, second and third circuit means comprises four trios of amplifiers with each of said trios associated with an assigned one of said photoreceptors.

* * * * *